US008649138B2

(12) United States Patent
Nakashima et al.

(10) Patent No.: US 8,649,138 B2
(45) Date of Patent: Feb. 11, 2014

(54) ELECTRICITY STORAGE SYSTEM AND CONTROL DEVICE

(75) Inventors: Takeshi Nakashima, Moriguchi (JP);
Yohei Yamada, Moriguchi (JP);
Takehito Ike, Moriguchi (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 13/427,212

(22) Filed: Mar. 22, 2012

(65) Prior Publication Data

US 2012/0236451 A1 Sep. 20, 2012

Related U.S. Application Data

(63) Continuation of application No. PCT/JP2011/073722, filed on Oct. 14, 2011.

(30) Foreign Application Priority Data

Oct. 15, 2010 (JP) ................................. 2010-233141

(51) Int. Cl.
*H02H 3/00* (2006.01)
*H02J 7/00* (2006.01)

(52) U.S. Cl.
USPC ............................................ 361/62; 320/134

(58) Field of Classification Search
USPC ............................................ 361/62; 320/134
See application file for complete search history.

(56) References Cited

U.S. PATENT DOCUMENTS

| 5,652,499 | A | * | 7/1997 | Morita et al. | 320/112 |
| 5,729,117 | A | * | 3/1998 | Fukuda | 320/117 |
| 5,747,969 | A | | 5/1998 | Tamai | |
| 5,969,503 | A | * | 10/1999 | Davis et al. | 320/120 |
| 6,075,344 | A | * | 6/2000 | Kawai | 320/134 |
| 7,573,234 | B1 | * | 8/2009 | Tsukamoto et al. | 320/116 |
| 2005/0103613 | A1 | * | 5/2005 | Miller | 200/400 |
| 2007/0247106 | A1 | * | 10/2007 | Kawahara et al. | 320/104 |

(Continued)

FOREIGN PATENT DOCUMENTS

| JP | 3-289332 A | 12/1991 |
| JP | 4-349370 A | 12/1992 |

(Continued)

OTHER PUBLICATIONS

International Preliminary Report on Patentability for International Application No. PCT/JP2011/073722, issued May 8, 2013.

(Continued)

*Primary Examiner* — Scott Bauer
(74) *Attorney, Agent, or Firm* — Cantor Colburn LLP

(57) ABSTRACT

There is provided an electricity storage system which comprises an electricity storage device, a charge and discharge switch device which is placed connected to the electricity storage device, a control block which is a charge and discharge control device which controls charging from a power supply and discharging from the electricity storage device to an external load, and an electricity storage device breaker with transmission and reception functions which is provided between the electricity storage device and the charge and discharge switch device, disconnects connection with the electricity storage device according to detection of abnormality of the electricity storage device or according to an instruction of the control block, and notifies the execution of the disconnection to the control block. The control block comprises a hardware disconnection instruction unit in addition to a software disconnection instruction unit.

7 Claims, 4 Drawing Sheets

(56) References Cited

U.S. PATENT DOCUMENTS

| | | | |
|---|---|---|---|
| 2009/0206679 A1* | 8/2009 | King et al. | 307/125 |
| 2010/0079108 A1 | 4/2010 | Monden et al. | |
| 2010/0085014 A1* | 4/2010 | Saeki et al. | 320/134 |
| 2011/0195618 A1* | 8/2011 | Arbuckle et al. | 440/3 |

FOREIGN PATENT DOCUMENTS

| | | |
|---|---|---|
| JP | 6-233475 A | 8/1994 |
| JP | 9-7641 A | 1/1997 |
| JP | 9-237640 A | 9/1997 |
| JP | 2001-309551 A | 11/2001 |
| JP | 2010-88202 A | 4/2010 |
| JP | 2010088202 A | 4/2010 |

OTHER PUBLICATIONS

International Preliminary Report on Patentability for International Application No. PCT/JP2011/073722, issued Apr. 16, 2013, with English translation.

Written Opinion of the International Searching Authority for International Application No. PCT/JP2011/073722, mailed Nov. 8, 2011.

* cited by examiner

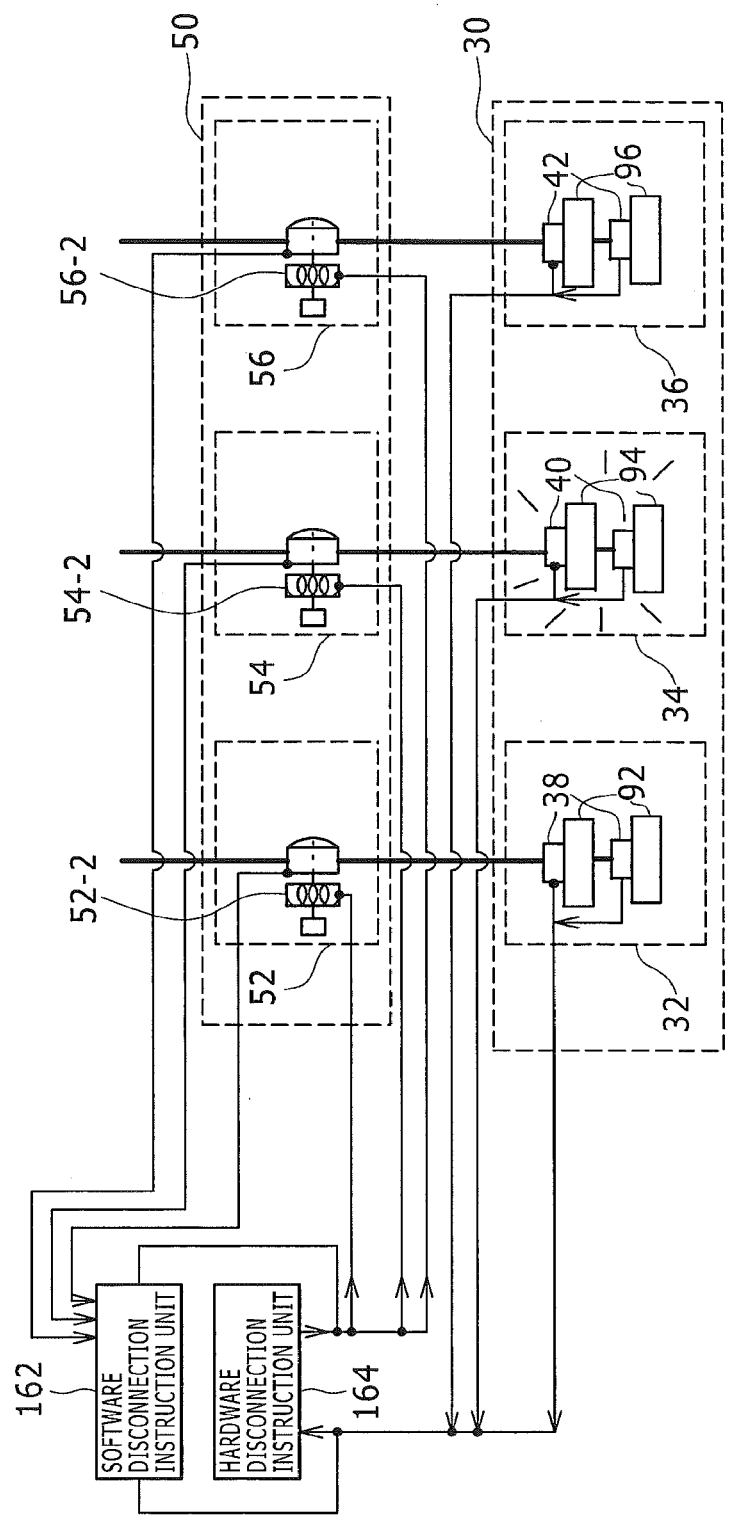
F I G. 2

ELECTRICITY STORAGE SYSTEM AND CONTROL DEVICE

CROSS-REFERENCE TO RELATED APPLICATION

The present application is a continuation application of International Application No. PCT/JP2011/073722, filed Oct. 14, 2011, the entire contents of which are incorporated herein by reference and priority to which is hereby claimed. The PCT/JP2011/073722 application claimed the benefit of the date of the earlier filed Japanese Patent Application Nos. JP2010-233141, filed Oct. 15, 2010, the entire contents of which are incorporated herein by reference, and priority to which is hereby claimed.

TECHNICAL FIELD

The present invention relates an electricity storage system to which an electricity storage device is connected through a breaker, and to a control device thereof.

BACKGROUND ART

Effective usage of energy is realized with the use of an electricity storage device such as a secondary battery. For example, in recent years, solar light power generation systems have been actively developed as eco-friendly, clean energy. Because a photoelectric conversion array which converts the solar light into electric power does not have an electricity storage function, the photoelectric conversion array is in some cases used in combination with a secondary battery. For example, the energy is effectively used by charge and discharge control to charge the electric power generated by the photoelectric conversion array into the secondary battery and to discharge the electricity from the secondary battery in response to a request from an external load or the like.

When an electricity storage system which executes the charge and discharge control in a combination of a secondary battery and a power supply is formed, a breaker is provided on the side of the electricity storage device, in order to protect the electricity storage device, which is the secondary battery.

Patent Literature 1 discloses a method of detecting, in a storage battery degradation state testing device of an alternating current uninterruptable power supply device which uses an inverter circuit receiving supply of electricity from a storage battery and a commercial power supply in combination, that a breaker provided between a charging circuit and the storage battery is not switched ON after the breaker is switched OFF when the storage battery is replaced, in which a storage battery voltage monitoring unit is provided, a capacitor is placed between the side of the charging circuit of the breaker and the ground, and detection of the reduction of the monitored voltage is facilitated.

As an electricity storage device protection technique different from the breaker, Patent Literature 2 discloses a charging method of a secondary battery wherein the secondary battery is rapidly charged while degradation of the battery performance is prevented by a pulse charge which repeats charging and discharging. In this reference, a switch and a discharging resistor are provided in parallel to the secondary battery, to form a discharging circuit.

RELATED ART REFERENCES

Patent Literature

[Patent Literature 1] JP H9-237640 A
[Patent Literature 2] JP H9-7641 A

DISCLOSURE OF INVENTION

Technical Problem

An electricity storage system includes various constituent elements other than the electricity storage device, such as a photoelectric conversion array, an electric power conversion device, a charge and discharge control device, etc. Of these elements, the electricity storage device is expensive, and, in order to protect the electricity storage device, various techniques may be employed such as a breaker, a discharge resistor, or the like, but the breaker in the related art is used manually, and, as described in Patent Literature 1, in many cases, the switching ON and OFF are not detected. In addition, because an electricity storage device of high voltage is stored in a housing, attachment of a discharging resistor is not easy. Thus, there remain problems in effective protection of the electricity storage device.

An advantage of the present invention lies in provision of an electricity storage system and a control device which allows effective protection of the electricity storage device.

Solution to Problem

According to one aspect of the present invention, there is provided a control device which controls charging and discharging of an electricity storage device which has a storage battery, charges electric power supplied from an electric power supply, and discharges the charged electric power to an eternal load, the control device comprising a receiving unit which receives a storage battery abnormality detection signal which is transmitted when the storage battery detects an abnormality, an outputting unit which outputs, when the storage battery abnormality detection signal indicates abnormality which satisfies a disconnection standard defined in advance, a disconnection instruction to a storage battery breaker provided corresponding to the storage battery, and a receiving unit which receives a disconnection report indicating that disconnection is executed.

According to another aspect of the present invention, there is provided a control device which controls charging and discharging of an electricity storage device which has a plurality of storage batteries, charges electric power supplied from an electric power supply, and discharges the charged electric power to an external load, wherein, based on a storage battery abnormality detection signal individually transmitted when each storage battery detects abnormality, at least one of a charge path and a discharge path of all of the storage batteries corresponding to the control device is disconnected by a storage battery breaker.

According to another aspect of the present invention, there is provided an electricity storage system comprising the above-described control device. In addition, the electricity storage system of the present invention comprises a storage battery breaker having a breaker one-side connection member which is provided on a connection terminal to be connected to a positive electrode of the storage battery and which attaches one end of a discharging resistor element for discharging the storage battery, and a breaker other-side connection member which is provided on a connection terminal to be connected to a negative electrode of the storage battery and which attaches the other end of the discharging resistor element.

According to another aspect of the present invention, preferably, the electricity storage system further comprises a fuse provided on a line through which an output current or an input current of a body of the storage battery flows, and a storage battery one-side connection member and a storage battery other-side connection member which attach ends of a discharging resistor element to a positive electrode-side terminal and a negative electrode-side terminal of the storage battery, respectively.

Advantageous Effects of Invention

According to various aspects of the present invention, the control device receives a storage battery abnormality detection signal, outputs a disconnection instruction to a storage battery breaker when the storage battery abnormality detection signal indicates an abnormality satisfying a disconnection standard which is defined in advance, and receives a disconnection report indicating that disconnection is executed. In this manner, an operation of the electricity storage device breaker can be controlled with an electric signal and the result can be known, and, consequently, the electricity storage device can be effectively protected. In addition, by setting all of the storage batteries in the disconnected state for abnormality of one storage battery, it is possible to prioritize protection of the storage battery when the reason for abnormality is not immediately understood, and to prevent spreading of the abnormality to the other storage batteries. Moreover, because a connection member is provided on a path between the storage battery and the breaker, when the storage battery is disconnected while in a state of excessive charge, the storage battery can be safely discharged using a discharging resistor element.

BRIEF DESCRIPTION OF DRAWINGS

FIG. 2 is a diagram for explaining a disconnection control in an electricity storage system according to a preferred embodiment of the present invention, picking and showing necessary portions.

BEST MODE FOR CARRYING OUT THE INVENTION

Figure 1:
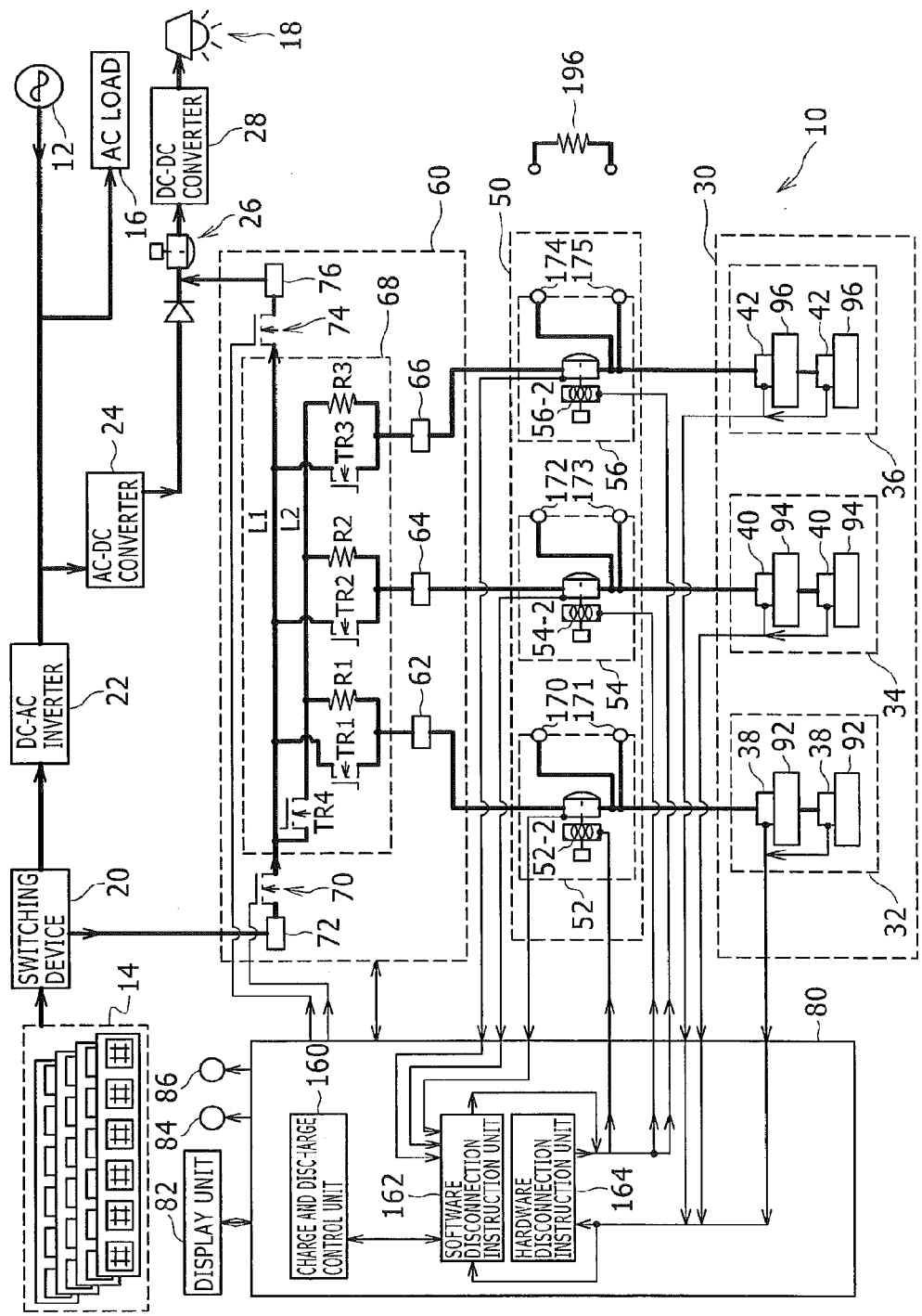
FIG. 1 is a diagram showing a structure of an electricity storage system according to a preferred embodiment of the present invention.

A preferred embodiment of the present invention will now be described in detail with reference to the drawings. In the following description, a lithium ion battery is explained as the storage battery, but alternatively, other secondary batteries may be employed. For example, the storage battery may be a nickel-metal hydride battery, a nickel-cadmium battery, or the like.

In addition, in the following description, solar-light-generated electric power and external commercial electric power are explained as an electric power supply, but alternatively, other electric power supplies such as, for example, wind-generated electric power or electric power by fuel cell or the like may be employed. Moreover, the number of the storage batteries in the electricity storage device and the number, a voltage value, or the like of solar light power generation modules (panels) forming a photoelectric conversion array for solar light power generation described below are merely exemplary for the purpose of explanation, and may be suitably changed according to the specifications of the electricity storage system or the like.

In addition, in the following description, similar elements in all drawings are denoted by the same reference numerals, and explanation will not be repeated. Moreover, in the explanation in this description, reference numerals which have already been used are referred to as necessary.

FIG. 1 is a diagram for explaining a structure of an electricity storage system 10. The electricity storage system 10 comprises an electricity storage device 30, a load-side breaker 26, an electricity storage device breaker 50, a charge and discharge switch device 60, and a control block 80. FIG. 1 also shows, although these are not constituent elements of the electricity storage system 10, an external commercial power supply 12 and a photoelectric conversion array 14 serving as power supplies, an AC load 16 and a DC load 18 serving as external loads, and a DC-DC converter 28 which converts power into a direct current voltage suitable for the DC load 18. In the following, alternating current will be referred to as AC and direct current will be referred to as DC according to the circumstances. In FIG. 1, a wide solid line shows a flow of electric power and a narrow solid line with an arrow at an end shows a flow of a signal.

The AC load 16 is a device or the like which is driven by alternating current power, and is, for example, a rotary electric device, an air-conditioning device, or a mechanical device such as a machining device or an assembling device. The DC load 18 is a device or the like which is driven by direct current power, and is, for example, a piece of office equipment, a lighting device, or the like. These loads are collectively referred to as an external load. The DC-DC converter 28 is a voltage converter which converts, for example, a direct current power of 96 V supplied from the electricity storage device 30 into direct current power of about 12 V suitable for the office equipment or the like.

The external commercial power supply 12 serving as the electric power supply is an alternating current power supply of a single phase or three phases, and is a common commercial power supply transmitted from a power generation plant. The photoelectric conversion array 14 serving as the electric power supply is a direct current power supply in which a plurality of solar light power generation modules (panels) are combined, and, in the example configuration of FIG. 1, 4 solar light power generation blocks in which a plurality of solar light power generation modules are placed are used. The 4 solar light power generation blocks are connected in parallel to each other. When 6 solar light power generation modules placed in each solar light power generation block are connected in series, an output operation voltage of about 240 V can be realized, and, when 3 solar light power generation modules placed in each solar light power generation block are connected in series and the series connections are connected in parallel to each other, an output operation voltage of about 120 V can be realized.

A switching device 20 is a connection switching device having a function to change a connection state of the plurality of solar light power generation modules (panels) of the photoelectric conversion array 14, in order to switch the output operation voltage between a voltage of about 240 V and a voltage of about 120 V, as described above. As the output operation voltage is switched with this switching, the switching device 20 may also be called a voltage switching device from this viewpoint. In addition, in the wide meaning, the switching device changes the form of the power supply and converts the solar light power generation into a 240-V direct current power supply or a 120-V direct current power supply, and, thus, the switching device may be considered as a type of power supply conversion device.

In addition, the switching device 20 has a function to connect the generated electric power of the photoelectric conversion array 14 to the side of a DC-AC inverter 22 or to the charge and discharge switch device 60 in a manner to allow alternate switching.

When the photoelectric conversion array 14 is connected to the side of the DC-AC inverter 22, six solar light power generation modules are connected in series (series connection form), and the electric power generated by the solar light power generation module can be supplied to the DC-AC inverter 22 at a relatively high voltage. In the series connection form, the photoelectric conversion array 14 and the charge and discharge switch device 60 are electrically disconnected. When the photoelectric conversion array 14 is connected to the charge and discharge switch device 60, three solar light power generation modules are connected in series, and the series connections are connected in parallel (parallel connection form), and the electric power generated by the solar light power generation module can be supplied to the charge and discharge switch device 60 at a relatively low voltage. In the parallel connection form, the photoelectric conversion array 14 and the DC-AC inverter 22 are electrically disconnected.

The switching device 20 and the control block 80 are connected by a communication line (not shown). The switching between the series connection form and the parallel connection form is executed by an instruction from the control block 80, and the information indicating the series or parallel connection form is transmitted to the control block 80. When electric power is supplied to the DC-AC inverter 22, the series connection state in which the output operation voltage is about 240 V is employed.

The DC-AC inverter 22 is an electric power converter which converts direct current power to alternating current power, and may be considered in the wider meaning as a type of a power supply conversion device. The DC-AC inverter 22 has a function to convert the direct current power of about 240 V from the switching device 20 into alternating current power and supply the same to the AC load 16. In some cases, the DC-AC inverter 22 may return the power to the side of the external commercial power supply 12, which is commonly called a reverse power flow or electricity selling.

An AC-DC converter 24 is an electric power converter which converts alternating current power to direct current power, and may be considered in a wider meaning as a type of a power supply conversion device. The AC-DC converter 24 converts alternating current power from the external commercial power supply 12 or the alternating current power converted by the DC-AC inverter 22 into direct current power as backup electric power when no direct current power is supplied from the electricity storage device 30 to the DC load 18. For example, when discharging from the electricity storage device 30 is limited for some reason, direct current power is supplied to the DC load 18 through the AC-DC converter 24.

The AC-DC converter 24 and the control block 80 are connected by a communication line (not shown) which can communicate digital data. Setting of an operation condition, an instruction value setting of the direct current power to be output (for example, an output voltage value), or the like are transmitted from the control block 80, and operation state data or the like are transmitted from the AC-DC converter 24 to the control block 80.

The load-side breaker 26 is an electric power disconnecting device provided between the electricity storage system 10 and the DC load 18. The load-side breaker 26 has a function to disconnect the flow of electric power when a current greater than or equal to a predefined threshold flows when the direct current power is supplied from the electricity storage device 30 or the like through the DC-DC converter 28 to the DC load 18.

The load-side breaker 26 may be a manual type device, and, in order to set to an electricity flowing state which is a connected state, a user manually executes a switching operation. The load-side breaker 26 and the control block 80 are connected by a communication line (not shown) which transmits a status signal, so that the control block 80 knows whether the load-side breaker 26 is currently in a connected state or in a disconnected state.

The charge and discharge switch device 60 is a charge and discharge switching device placed to be connected to the electricity storage device 30 to realize charging from the electric power supply to the electricity storage device 30 and discharging from the electricity storage device 30 to an external load. More specifically, the charge and discharge switch device 60 is placed between the switching device 20 and the electricity storage device 30 as a side of a charge path and between the load-side breaker 26 and the electricity storage device 30 as a side of a discharge path.

The charge and discharge switch device 60 comprises a charge switch 70 on the side of the charge path, a discharge switch 74 on the side of the discharge path, and a storage battery selecting circuit 68 which can select a storage battery to be charged or discharged according to states of charge of a plurality of storage batteries 32, 34, and 36. In addition, in order to detect a state of charge/discharge, electricity storage device-side current and voltage detection units 62, 64, and 66 are provided on the side of the electricity storage device 30, a charge-side current and voltage detection unit 72 is provided on the side of the charge switch 70 near the switching device 20, and a discharge-side current and voltage detection unit 76 is provided on the side of the discharge switch 74 near the load-side breaker 26.

The charge switch 70 and the discharge switch 74 are semiconductor switching elements which are switched ON and OFF by an electric signal; more specifically, a field-effect transistor (FET) may be employed. The electricity storage device-side current and voltage detection units 62, 64, and 66, the charge-side current and voltage detection unit 72, and the discharge-side current and voltage detection unit 76 may be formed by a voltage detecting sensor and a current detecting sensor. The electricity storage device 30 comprises the three storage batteries 32, 34, and 36 having the same shape and same performance as shown in FIG. 1, and the electricity storage device-side current and voltage detection units 62, 64, and 66 are provided corresponding to the storage batteries 32, 34, and 36, respectively. The number of storage batteries of the electricity storage device 30 is not limited to three, and may be increased or decreased according to the required electric power. However, it is important that the charge and discharge switch device 60 is provided in the charge and discharge paths, so that the storage batteries appear to function as a single battery in the electricity storage system 10.

The charge switch 70 and the discharge switch 74 are connected with the control block 80 by communication lines through which charge and discharge instructions are transmitted. The charge and discharge instructions from the control block 80 are realized by a 0/1 signal indicating the switching ON and OFF of the switch. The electricity storage device-side current and voltage detection units 62, 64, and 66, the charge-side current and voltage detection unit 72, and the discharge-side current and voltage detection unit 76 are respectively connected to the control block 80 by a communication line (not shown) through which detected information can be transmitted.

Similar to the load-side breaker 26, the electricity storage device breaker 50 has a function to disconnect the flow of electric power when a current greater than or equal to a predefined threshold flows. The electricity storage device breaker 50 is provided between the electricity storage device 30 and the charge and discharge switch device 60, and comprises 3 breakers 52, 54, and 56 corresponding to the three storage batteries 32, 34, and 36 of the electricity storage device 30, respectively. In FIG. 1, the breaker 52 is placed corresponding to the storage battery 32, the breaker 54 is placed corresponding to the storage battery 34, and the breaker 56 is placed corresponding to the storage battery 36. The three breakers 52, 54, and 56 are storage battery breakers having the same shape and the same performance, but in order to distinguish between the individual storage battery breaker and the electricity storage device breaker 50 which is a collected body of the three storage battery breakers, here, the individual storage battery breakers are simply referred to as breakers 52, 54, and 56.

The electricity storage device breaker 50 has a function to transmit and receive digital data to and from the control block 80, can switch from the connected state to the disconnected state by an instruction of the control block 80, and transmits to the control block 80 a status signal indicating whether the current state is the connected state or the disconnected state. The instruction signal and the status signal are transmitted with 0/1 signals. The transmission of these signals is executed for each of the breakers 52, 54, and 56. Similar to the load-side breaker 26, the electricity storage device breaker 50 can be switched from the disconnected state to the connected state in which electricity flows, by a manual switching operation performed by the user.

A function to transmit and receive for the electricity storage device breaker 50 may be realized by providing a CPU in each of the breakers 52, 54, and 56. However, in consideration of the cost and the higher failure rate, a simplified structure as described below may be employed. Specifically, the breakers 52, 54, and 56 are formed with coils 52-2, 54-2, and 56-2, and first and second switches (not shown). The coils 52-2, 54-2, and 56-2 function as receiving units, and generate magnetic forces in response to a disconnection instruction from the control block 80, to cause the first switch to operate. The first switch then functions as a disconnection unit and disconnects the circuit in response to the magnetic force of the coil. The second switch is a switch which is provided on a line (not shown) from the control block 80, and which is switched ON and OFF in a linked manner with the first switch. After the control block 80 outputs the disconnection instruction, the control block 80 applies a predetermined voltage of, for example, 5 V, on one end of the second switch through the line (not shown). Because the second switch is linked to the first switch, the other end of the second switch is not set to 5 V. This phenomenon is transmitted to the control block 80 as a confirmation signal for the disconnection. On the contrary, if the voltage of 5 V applied to the second switch appears on the other end as is even though the control block 80 has output the disconnection instruction, the breaker is not functioning, and, therefore, the control block 80 issues an alert and switches OFF to stop the charging and discharging. Alternatively, the second switch and the first switch may be linked in a reverse manner, so that the voltage of 5 V appears on the other end of the second switch only when the breaker has disconnected the circuit. In other words, the second switch functions as a transmitting unit, and transmits the disconnection/connection state of the first switch; that is, the breaker, to the control block 80.

The electricity storage device 30 is formed by connecting the storage batteries 32, 34, and 36 in parallel. The storage batteries 32, 34, and 36 are combined batteries in which a plurality of lithium ion single batteries are combined, and are secondary batteries which can be charged and discharged, and each has a structure in which two storage battery packs 92, 94, 96 are connected in series. In each of the storage battery packs 92, 94, and 96, a plurality of lithium ion single batteries are combined in series and in parallel and stored in a single combined battery casing.

Storage battery state detection units 38, 40, and 42 are provided in the combined battery casing for each of the storage battery packs 92, 94, and 96, respectively, and are sensors having a function to detect, as an internal state of the storage battery pack, a voltage between positive and negative electrodes of the storage battery pack, a current flowing in the storage battery pack, a temperature in the storage battery pack, etc., and to transmit the internal state to the control block 80. The storage battery state detection unit also has a function to detect an abnormality state such as excessive current, excessive discharge, excessive charge, etc. as the internal state and transmit the internal state to the control block 80. The storage battery state detection units 38, 40, and 42 and the control block 80 are connected by signal lines through which the internal state of the storage battery pack can be transmitted as a digital signal.

In each of the storage batteries 32, 34, and 36, two storage battery packs are connected in series, and, because the storage battery state detection unit is provided for each storage battery pack, a total of six storage battery state detection units are provided in the electricity storage device 30. The signal lines from two storage battery state detection units provided in the storage battery pack are connected to the control block 80.

As described, each of the storage battery packs 92, 94, and 96 has, in the combined battery casing, various sensors and a transmission and reception circuit for the detected signal of the sensors. In the following description, in order to simplify description, the two storage battery state detection units provided in each of the storage batteries 32, 34, and 36 will be collectively called storage battery state detection units 38, 40, and 42.

The control block 80 is a controlling device having a function to wholly control the constituent elements with regard to the charging and discharging of the electricity storage system 10. A display unit 82 connected to the control block 80 is a small-size display which can display an error content or the like during execution of a self-diagnosis function or the like. An operation lamp 84 is a display lamp which is switched ON during an operation state of the electricity storage system 10. An error lamp 86 is an alert display lamp which is switched ON when an abnormality occurs in the electricity storage system 10. Therefore, when the electricity storage system 10 is operating normally, the operation lamp 84 is switched ON and the error lamp 86 is switched OFF.

As described above, the control block 80 has a function to control the overall operation of the electricity storage system 10. The control block 80 comprises a charge and discharge control unit 160 which controls charging and discharging of the electricity storage device 30 by ON/OFF control of the charge switch 70 and the discharge switch 74, a software disconnection instruction unit 162 which outputs a disconnection instruction to the electricity storage device breaker 50 by software processing when the detection of abnormality of the electricity storage device 30 satisfies a predefined disconnection standard, and a hardware disconnection instruction unit 164 which outputs a disconnection instruction to the electricity storage device breaker 50 by hardware processing when the detection of abnormality of the electricity storage device 30 satisfies a predefined disconnection standard. The software disconnection instruction unit 162 and the hardware disconnection instruction unit 164 are output units which output the disconnection instruction to the electricity storage device breaker 50. In addition, because the two output units have a function to manage disconnection of the electricity storage device breaker 50, the two output units may also be called electricity storage device breaker disconnection management units.

An operation of the above-described structure; in particular, the disconnection instruction function of the control block 80, will now be described in detail. FIG. 2 is a diagram picking and showing, as parts necessary for explaining the disconnection control in the electricity storage system 10, the electricity storage device 30, the electricity storage device breaker 50, and the software disconnection instruction unit 162 and the hardware disconnection instruction unit 164 of the control block 80. Here, a case is shown where, of the three storage batteries 32, 34, and 36 of the electricity storage device 30, an abnormality is detected in the storage battery 34.

The predefined disconnection standard is a standard which is defined for disconnecting the electricity storage device breaker 50, in order to protect the electricity storage device 30. More specifically, the disconnection standard may be defined as a time when the storage batteries 32, 34, and 36 are in a state of excessive charge or excessive discharge, when a period during which a charging current value exceeds a predefined upper limit current value exceeds a predefined threshold period, when a period during which a discharge current value exceeds a predefined upper limit current value exceeds a predefined threshold period, etc.

Detection of abnormality of the electricity storage device 30 is executed by the storage battery state detection units 38, 40, and 42, and the detection data are transmitted to the control block 80 via a signal line. The signal lines for transmitting the abnormality detection of the storage batteries 32, 34, and 36 are connected to the control block 80 from the respective storage battery state detection units 38, 40, and 42, but are collected to one line before the electricity storage device breaker disconnection management unit. Therefore, when one of the three storage battery state detection units 38, 40, and 42 outputs the storage battery abnormality detection signal, even if the other two detection units do not detect abnormality, the electricity storage device 30 as a whole is handled as detecting abnormality. In addition, when one of the six storage battery state detection units in battery packs outputs the storage battery abnormality detection signal, the other five detection units are handled as abnormality detected in the electricity storage device 30.

The signal detecting the abnormality for the overall electricity storage device 30 is sent to both the software disconnection instruction unit 162 and the hardware disconnection instruction unit 164. The software disconnection instruction unit 162 is a CPU in which the signal data are processed by software, and the disconnection instruction is output after the time period required for the software calculation process has elapsed. Because the hardware disconnection instruction unit 164 uses a high-speed switching element or the like which quickly responds to the abnormality detection signal, the hardware disconnection instruction unit 164 can output the disconnection instruction significantly faster than the disconnection signal of the software disconnection instruction unit 162.

The hardware disconnection instruction unit 164 receives the storage battery abnormality detection signal, and, if the signal exceeds a threshold which is defined in view of the safety of the system, the hardware disconnection instruction unit 164 immediately outputs the disconnection instruction, judging that the disconnection standard is satisfied. For example, in a system which defines a cell voltage of each lithium ion single battery of the storage battery packs 92, 94, and 96 as 4 V in the fully charged state, when the cell voltage is greater than or equal to 4.22 V or when a current flowing in any of the breakers 52, 54, and 56 is greater than or equal to 35 V, which significantly exceeds a upper limit current value of 30 A, the hardware disconnection instruction unit 164 immediately outputs the disconnection instruction. A time when the threshold which is defined in view of the safety of the system is exceeded may be called a time when a first standard is satisfied.

The disconnection instruction which is output from the hardware disconnection instruction unit 164 is one signal, but the signal line is divided into three lines, and the disconnection instruction is transmitted to the breakers 52, 54, and 56. Specifically, in the example configuration of FIG. 2, the storage battery 34 satisfies the predefined disconnection standard and the other storage batteries 32 and 36 are normal, but the disconnection instruction is simultaneously transmitted to the three breakers 52, 54, and 56, and, thus, all of the three storage batteries 32, 34, and 36 are set to the disconnected state. In the electricity storage system 10 having the plurality of storage batteries 32, 34, and 36, disconnection of only the storage battery 34 in which abnormality is detected is normally performed, but if only the storage battery 34 in which the abnormality occurs is disconnected, a necessity to handle the charging and discharging with the remaining two storage batteries 32 and 36 suddenly arises, a current of 1.5 times the normal current is concentrated, and, as a result, the abnormality of one storage battery 34 may cause a chain of abnormalities in the other storage batteries 32 and 36, resulting in a multiple abnormality. If such a multiple abnormality occurs, in some cases, replacement of the storage batteries 32 and 36 which are basically normal becomes necessary, resulting in a longer time period for recovery from the abnormality and three times the replacement cost. In the present electricity storage system 10, the normal storage batteries 32 and 36 are disconnected along with and simultaneously with the storage battery 34 in which abnormality is detected, and, thus, the multiple abnormality can be prevented in advance.

In the case of abnormality which does not satisfy the first standard, the hardware disconnection instruction unit 164 does not output the disconnection instruction. In this case, the software disconnection instruction unit 162 judges the degree of abnormality, and, if the software disconnection instruction unit 162 judges that the system cannot be recovered by normal charging and discharging and that disconnection is required, the software disconnection instruction unit 162 outputs the disconnection instruction. For example, in a system in which the cell voltage of each lithium ion single battery of the storage battery packs 92, 94, and 96 is defined as 4 V in the fully charged state, when the cell voltage is greater than or equal to 4.15 V, or when a current flowing in any of the breakers 52, 54, and 56 is greater than or equal to 30 A, which is the upper limit current value, the software disconnection instruction unit 162 outputs the disconnection instruction. Alternatively, the disconnection instruction may be output after a state where the current of greater than or equal to 30 A flows is continued for 10 seconds and it is judged that the disconnection standard is satisfied. In this case also, even if the abnormality is an abnormality from one storage battery, the disconnection instruction is simultaneously transmitted to all of the three breakers 52, 54, and 56. In addition, because the breakers 52, 54, and 56 have transmission and reception functions, whether or not the breakers are actually disconnected is notified from the breakers 52, 54, and 56 to the software disconnection instruction unit 162.

Alternatively, a configuration may be employed in which, when the first standard is satisfied, the disconnection instruction from the software disconnection instruction unit 162 is output in addition to the disconnection instruction from the hardware disconnection instruction unit 164. In other words, the disconnection instruction from the software disconnection instruction unit 162 and the disconnection instruction from the hardware disconnection instruction unit 164 may overlap.

In the case of the abnormality which does not satisfy any of the disconnection standards defined in advance; for example, when it is judged that the storage battery 34 is close to excessive charge, the current value of the charging and discharging of the overall system is adjusted so that the abnormality does not chain to the normal storage batteries 32 and 36, and then, the charge and discharge switch device 60 attempts a recovery with a normal operation such as stopping the charging to the storage battery 34. The software disconnection instruction unit 162 can receive abnormality information from the charge and discharge control unit 160 or other detection device and control device of the electricity storage system 10, can judge the content of the abnormality information, and can output the disconnection instruction to the breakers 52, 54, and 56 according to the result of the judgment. As such abnormality information, there may be considered failure of the semiconductor switching element in the charge and discharge switch device 60 and an emergency situation such as fire or earthquake in a room where the electricity storage system 10 is placed or at a peripheral location. In addition, a status signal indicating whether the current state of each of the breakers 52, 54, and 56 is the connected state or the disconnected state is transmitted to the software disconnection instruction unit 162. With this configuration, for example, it is possible to judge whether or not the breakers 52, 54, and 56 have correctly disconnected in response to the disconnection instruction. In order to individually control the breakers 52, 54, and 56, the control becomes complex, and, therefore, reliable operation at the time of emergency is not guaranteed. On the contrary, in the present electricity storage system 10, the abnormality detection and disconnection instruction are realized with one signal, and, thus, the system is simple and tends to not fail, resulting in a high degree of reliability for the overall system.

Figure 3:
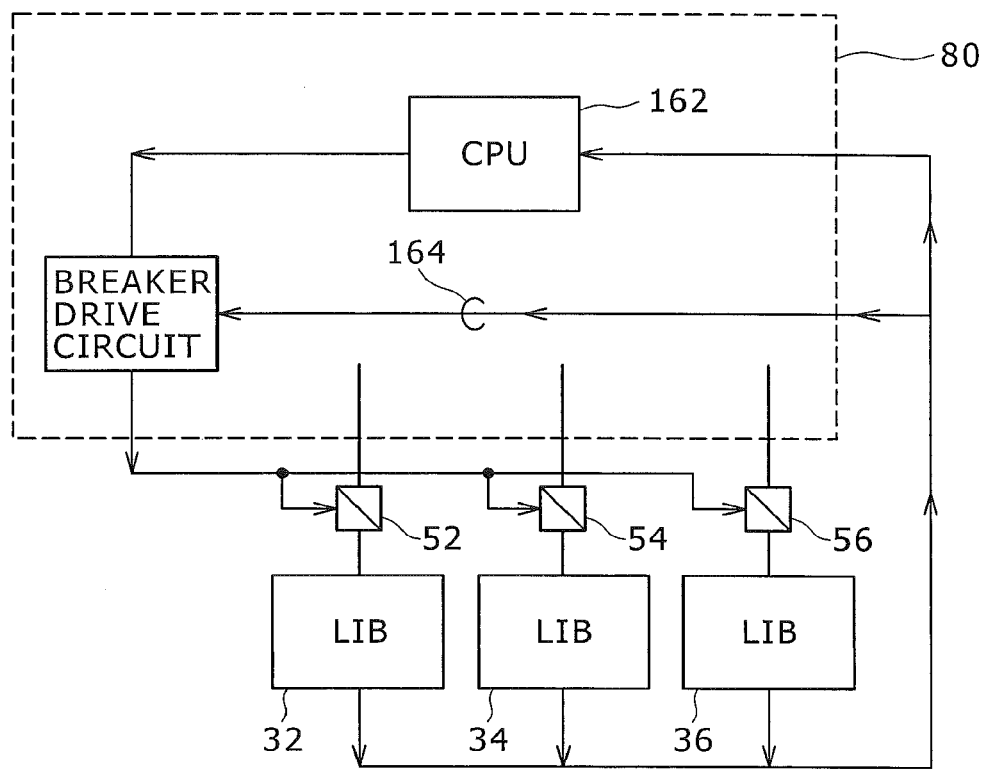
FIG. 3 is a schematic diagram explaining a disconnection control in an electricity storage system according to a preferred embodiment of the present invention.

FIG. 3 is a schematic diagram for explaining a disconnection control in the electricity storage system 10 described above. Elements labeled LIB in FIG. 3 are the storage batteries 32, 34, and 36, the term LIB being an abbreviation for lithium ion battery. An element shown as a CPU is the software disconnection instruction unit 162. As shown in FIG. 3, the abnormality detection signals from the three storage batteries 32, 34, and 36 are collected into one signal and transmitted to the software disconnection instruction unit 162 and the hardware disconnection instruction unit 164. The hardware disconnection instruction unit 164 reflexively outputs the disconnection instruction, and the resulting disconnection instruction is divided into three signals and transmitted to each of the three breakers 52, 54, and 56.

All of the storage batteries are set in the disconnected state in response to the abnormality of one storage battery, in order to place priority on the protection of the storage battery without the execution of a judgment process in the case where the cause of the abnormality is not immediately known. In addition, when the operations of the charge and discharge control unit 160 and the charge and discharge switch device 60 have failed, even if the storage battery which has output the abnormality detection signal first is disconnected, the cause of the abnormality is not resolved, and the abnormality may spread to the other storage batteries.

In addition, the abnormality detection signal is transmitted to the software disconnection instruction unit 162 even though the hardware disconnection instruction unit 164 rapidly executes a process because, first, the states of the electricity storage device 30 and the electricity storage device breaker 50 must be managed by the software disconnection instruction unit 162. With this process, the states of the electricity storage device 30 and the electricity storage device breaker 50 can be compared with the status signals of the breakers 52, 54, and 56, and the normal operation of the electricity storage system 10 can be confirmed. When the breakers 52, 54, and 56 are not disconnected after a predetermined time has elapsed after the software disconnection instruction unit 162 receives the abnormality detection signal, it is judged that a critical failure has occurred, and the entirety of the electricity storage system 10 is switched OFF. A second reason is that, even in the case where a delay or a failure has occurred in the processing of the hardware disconnection instruction unit 164 due to some reason, the breakers 52, 54, and 56 can be disconnected by the disconnection instruction from the software disconnection instruction unit 162, resulting in a safer system.

The disconnection control has been described. According to the present configuration, for example, when the storage batteries 32, 34, and 36 become excessively charged, the breakers 52, 54, and 56 are disconnected as described above, and the storage battery judged as excessively charged would maintain the excessive charge state. Because a plurality of lithium ion single batteries are combined in the storage batteries 32, 34, and 36 as described above, the storage battery has a high voltage, and remaining at the excessively charged state is not desirable. In such a case, the storage battery can be discharged using a discharging resistor element 196. A discharge process of the storage batteries 32, 34, and 36 at the time of the breaker disconnection or the like will now be described.

First, the structures of the breaker and the storage battery will be described with reference to FIGS. 4 and 6. Here, for the sake of simplicity, the storage battery is assumed to have a single storage battery pack, and only the storage battery 36 is shown, but the storage batteries 32 and 34 have similar structures. In each of the breakers 52, 54, and 56, two connection members are provided. That is, breaker one-side connection members 170, 172, and 174, and breaker other-side connection members 171, 173, and 175 are provided.

The breaker one-side connection members 170, 172, and 174 are attachment members which extend from positive side connection terminals connected to the corresponding storage batteries 32, 34, and 36, and connect one end of the discharging resistor element 196 for discharging the storage battery. The breaker other-end connection members 171, 173, and 175 are attachment members which extend from negative side connection terminals of the corresponding breakers, and connect the other end of the discharging resistor element 196.

Here, the discharging resistor element 196 is a resistive element having connection members on both ends, is normally detached, and is attached to the storage batteries for discharging when the storage batteries 32, 34, and 36 become excessively charged due to some reason. As the resistance value, there is set a value which allows the storage batteries 32, 34, and 36 to become a suitable SOC within a set discharge time which is set in advance, when the storage batteries 32, 34, and 36 are excessively charged. In particular, it is desirable to set a resistance value or employ a structure such that the highest temperature when the battery is discharged from the amount of charge judged as excessive charge to the suitable amount of charge is lower than or equal to 60° C. and the battery can be discharged within 1 hour. Here, SOC is an abbreviation for the State Of Charge, and represents the SOC (degree of charge) in each storage state of the electric power in percentage, with a standard at the SOC (degree of charge) at the maximum storage state which is set by the user being 100. Of the connection members on both ends of the discharging resistor element 196, the connection member on one end preferably has a shape which can be easily connected to the breaker one-side connection members 170, 172, and 174, and the connection member of the other end preferably has a shape which can be easily connected to the breaker other-side connection members 171, 173, and 175.

The shape of the connection member on one end of the discharging resistor element 196 and the shape of the connection member on the other end may differ from each other, but are preferably the same if no condition is imposed on the direction of the current flowing in the resistor element. When the shape of the connection member on the one end of the discharging resistor element 196 and the shape of the connection member on the other end are set as the same shape, all of the breaker one-side connection members 170, 172, and 174 and the breaker other-side connection members 171, 173, and 175 have the same shape. For example, the connection members on both ends of the discharging resistor element 196 may have a plug-like shape and the breaker one-side connection members 170, 172, and 174 and the breaker other-side connection members 171, 173, and 175 may have a plug insertion hole shape. The plug insertion hole may be provided at outer peripheral portions of the housings of the breakers 52, 54, and 56.

Figure 4:
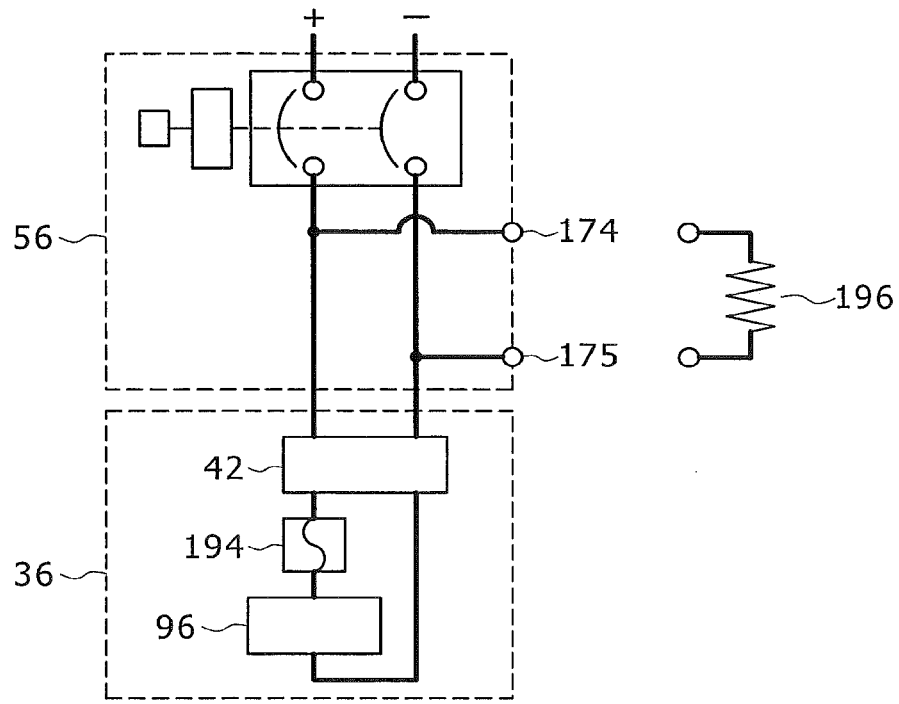
FIG. 4 is a diagram showing use of a discharging resistor in a breaker in an electricity storage system according to a preferred embodiment of the present invention.

FIG. 4 shows a detailed structure of the breaker 56 and the storage battery 36, and shows the breaker one-side connection member 174 and the breaker other-side connection member 175.

In the storage batteries 32, 34, and 36, sometimes, fuses 190, 192, and 194 may be provided for protecting the battery pack. The fuses 190, 192, and 194 are excessive current protection elements which are fused and cut when the input current or the output current of the storage batteries 32, 34, and 36 exceeds a predefined fusion-cut current. The fuses 190, 192, and 194 are provided on lines in which the output currents (input currents) of the storage batteries 32, 34, and 36 flow.

In addition, storage battery one-side connection members 180, 182, and 184 and storage battery other-side connection members 181, 183, and 185 are provided on the storage batteries 32, 34, and 36. The storage battery one-side connection members 180, 182, and 184 and the storage battery other-side connection members 181, 183, and 185 are connection members which can be used in place of the breaker one-side connection members 170, 172, and 174 and the breaker other-side connection members 171, 173, and 175 provided in the breakers 52, 54, and 56 in cases where the discharging resistor element 196 cannot be attached to the breakers 52, 54, and 56, and are used to forcefully discharge when the fuses 190, 192, and 194 are fused and cut.

Figure 6:
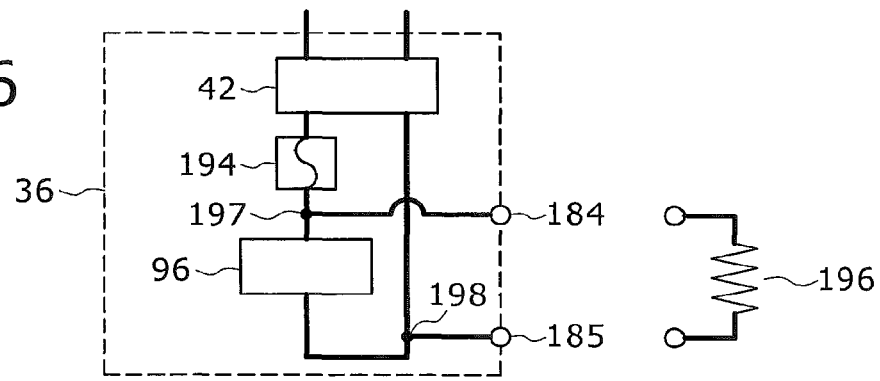
FIG. 6 is a diagram showing use of a discharging resistor in a storage battery in place of FIG. 4.

FIG. 6 shows a detailed structure of the storage battery 36, and shows the fuse 194, the storage battery one-side connection member 184, and the storage battery other-side connection member 185. In addition, as shown in FIG. 6, the storage battery one-side connection members 180, 182, and 184 extend from a positive electrode side terminal of the body of the storage battery through a first branch point 197, and the storage battery other-side connection members 181, 183, and 185 extend from a negative electrode side terminal of the body of the storage battery through a second branch point 198. The fuses 190, 192, and 194 are provided, on the lines through which the output currents (input currents) of the storage batteries 32, 34, and 36 flow, between the branch point 197 or 198 and the breakers 52, 54, and 56. With this configuration, even when the fuse is fused and cut, the discharging resistor element 196 can be attached to the connection members so that the storage batteries 32, 34, and 36 can be discharged.

When the plug-like shape is employed for the connection members on both ends of the discharging resistor element 196 as described above, the storage battery one-side connection members 180, 182, and 184 and the storage battery other-side connection members 181, 183, and 185 may have a plug insertion hole shape provided on an outer peripheral portion of the housing of the storage battery.

Next, operations of circuits with regard to the discharging process of the storage batteries 32, 34, and 36 will be described with reference to FIGS. 4-7.

Figure 5:
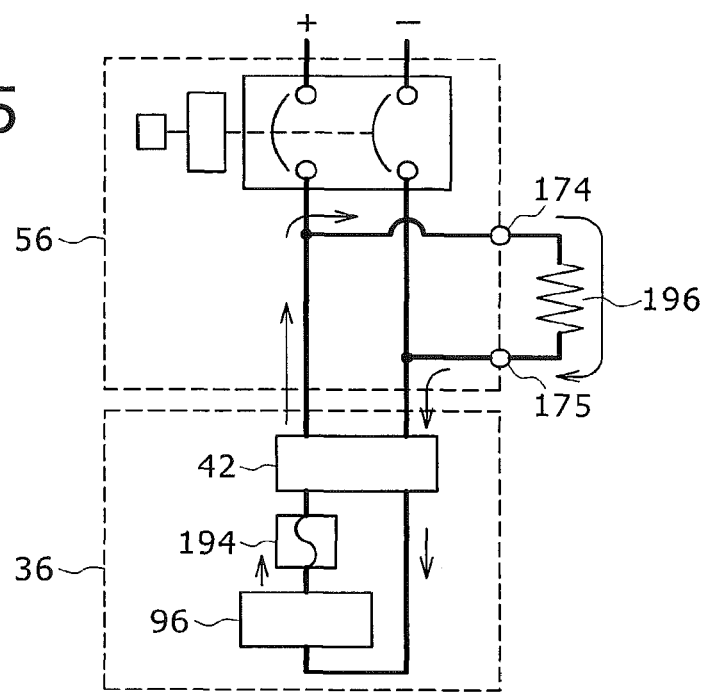
FIG. 5 is a diagram showing a discharge current in FIG. 4.

FIGS. 4 and 5 are diagrams showing an example of excessive charge of the storage battery 36, in which the plug-shaped connection members on both ends of the discharging resistor element 196 are inserted into the breaker one-side connection member 174 and the breaker other-side connection member 175 which are plug insertion holes provided on the outer peripheral portion of the breaker housing of the breaker 56. FIG. 4 shows a state before the plug-shapes of both ends of the discharging resistor element 196 are inserted into the plug insertion holes of the breaker 56, and FIG. 5 shows a flow of electricity when the plugs have been inserted. With the charges of the storage battery 36 flowing through the discharging resistor element 196 in this manner, the electric power is consumed as heat, the battery is discharged, and the excessive charging is resolved.

Figure 7:
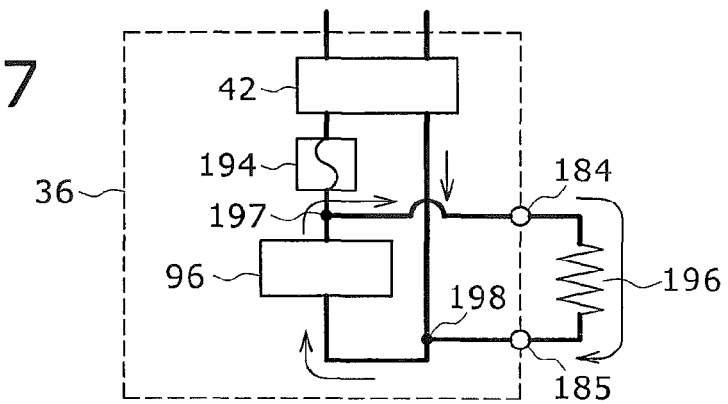
FIG. 7 is a diagram showing a discharge current in FIG. 6.

FIGS. 6 and 7 are diagrams showing an example of excessive charging of the storage battery 36, in which the plug-shaped connection members on both ends of the discharging resistor element 196 are inserted into the storage battery one-side connection member 184 and the storage battery other-side connection member 185, which are plug insertion holes provided on the outer peripheral portion of the housing of the storage battery 36. FIG. 6 shows a state before the plug shapes on both ends of the discharging resistor element 196 are inserted into the plug insertion holes of the storage battery 36, and FIG. 7 shows a flow of current when the plugs have been inserted. With the charges of the storage battery 36 flowing through the discharging resistor element 196 in this manner, the electric power is consumed as heat, the battery is discharged, and excessive charging is resolved.

The discharging resistor element 196 is not limited for resolving the excessive charging of the storage batteries 32, 34, and 36, and may similarly be used when discharging is necessary. In addition, with use of a charger and a secondary battery in place of the discharging resistor element 196, the electric power discharged when the excessive charging is resolved can be utilized without wasting the electric power.

INDUSTRIAL APPLICABILITY

The electricity storage system according to the present invention can be used for a system having a plurality of storage batteries and a breaker. In particular, when the storage battery is a storage battery pack in which a plurality of single batteries are combined, as the voltage of each storage battery pack is high, the generation of fire in the case of state abnormality can be reliably prevented, the reliability of the electricity storage system can be improved, and the expensive storage battery pack can be reliably protected. Therefore, the system can be used in a large-scale electricity storage system.

The invention claimed is:

1. A control device which controls charging and discharging of an electricity storage device which has a storage battery, charges electric power supplied from an electric power supply, and discharges the charged electric power to an external load, the control device comprising:
a receiving unit which receives a storage battery abnormality detection signal which is transmitted when the storage battery detects abnormality;
an outputting unit which outputs a disconnection instruction to a disconnection unit, which has a function to disconnect the flow of electric power for the storage battery and which is provided corresponding to the storage battery, when the storage battery abnormality detection signal does not satisfy a first standard defined in advance, judgment is made as to whether or not the disconnection of the disconnection unit is to be executed, and, if the abnormality is judged to be abnormality in which the disconnection is to be executed.

2. A control device which controls charging and discharging of an electricity storage device which has a plurality of storage batteries, charges electric power supplied from an electric power supply, and discharges the charged electric power to an external load, wherein
based on a storage battery abnormality detection signal individually transmitted when each storage battery detects abnormality, at least one of a charge path and a discharge path of all of the storage batteries corresponding to the control device is disconnected by a plurality of disconnection units provided corresponding to the storage batteries.

3. An electricity storage system comprising an electricity storage device having a plurality of storage batteries and a control device which controls charging and discharging of the electricity 5 storage device to charge electric power supplied from an electric power supply and discharge the charged electric power to an external load, wherein the control device comprises:
a receiving unit which receives a storage battery abnormality detection signal which is transmitted by each storage battery when abnormality occurs;
an outputting unit which outputs a disconnection instruction to a disconnection unit, which has a function to disconnect the flow of electric power for the storage battery and which is provided corresponding to the storage battery, when the storage battery abnormality detection signal does not satisfy a first standard defined in advance, judgment is made as to whether or not the disconnection of the storage battery breaker is to be executed, and, if the abnormality is judged to be abnormality in which the disconnection is to be executed.

4. An electricity storage system comprising:
an electricity storage device having a plurality of storage batteries;
a plurality of disconnection units, each of which has a function to disconnect the flow of electric power for the storage battery and each of which is provided corresponding to the storage batteries; and
a control device which controls charging and discharging of the electricity storage device to charge electric power supplied from an electric power supply and discharge the charged electric power to an external load, wherein
the control device disconnects, with the disconnection units, at least one of a charge path and a discharge path of all of the storage batteries corresponding to the control device, based on a storage battery abnormality detection signal individually transmitted when each storage battery detects abnormality.

5. The electricity storage system according to claim 4, wherein
the disconnection unit comprises:
a disconnection unit one-side connection member which is provided on a connection terminal to be connected to a positive electrode of the storage battery and which attaches one end of a discharging resistor element for discharging the storage battery; and
a disconnection unit other-side connection member which is provided on a connection terminal to be connected to a negative electrode of the storage battery and which attaches the other end of the discharging resistor element.

6. The electricity storage system according to claim 4, wherein
the storage battery comprises:
a fuse provided on a line through which an output current or an input current of a body of the storage battery flows;
a storage battery one-side connection member which is provided on a positive electrode-side terminal of the storage battery and which attaches one end of a discharging resistor element for discharging the electricity storage device; and
a storage battery other-side connection member which is provided on a negative electrode-side terminal of the storage battery and which attaches the other end of the discharging resistor element.

7. The electricity storage device according to claim 6, wherein
the storage battery one-side connection member extends from a positive electrode-side terminal of a body of the storage battery through a first branch point, and the storage battery other-side connection member extends from a negative electrode-side terminal of the body of the storage battery through a second branch point, and
the fuse is provided between the first branch point or the second branch point and the breaker, of a line through which an output current or an input current of the storage battery flows.

* * * * *